Aug. 27, 1968 J. TAYLOR 3,399,308

SCANNER ASSEMBLY WITH AUTOMATICALLY RECIPROCATING PHOTOELECTRIC TRANSDUCER HAVING ADJUSTABLE SLIT

Filed Sept. 1, 1965 2 Sheets-Sheet 1

INVENTOR.
JOHN TAYLOR

BY

Flehr and Swain
ATTORNEYS

INVENTOR.
JOHN TAYLOR
BY
Flehr and Swain
ATTORNEYS 3,399,308

SCANNER ASSEMBLY WITH AUTOMATICALLY RECIPROCATING PHOTOELECTRIC TRANSDUCER HAVING ADJUSTABLE SLIT

John Taylor, Santa Clara, Calif., assignor to Beckman Instruments, Inc., a corporation of California Filed Sept. 1, 1965, Ser. No. 484,330
7 Claims. (Cl. 250—235)

This invention relates generally to a scanner assembly and more particularly to a scanner assembly for moving a photo-electric device to scan a light image, such as the image formed when a solution is optically analyzed, to produce electrical output signals representative of the variations in characteristics (i.e., intensity, color, etc.) along the image.

In copending application Ser. No. 452,681, filed May 3, 1965, entitled "Photoelectric Scanning System for Ultracentrifuges," there is described a system which includes an optical system to provide an image of the ultracentrifuge cell at an image plane. The image is scanned by a photoelectric device to generate an electrical signal corresponding to the intensity of the image, which is representative of concentration of the material in the ultracentrifuge cell, during centrifugation. The signal is processed to give an indication of the concentration along the cell.

It is an object of the present invention to provide a scanning assembly suitable for scanning a photoelectrical device across an optical image, such as the image formed by the optical system of an ultracentrifuge.

It is a further object of the present invention to provide a scanner assembly which reversibly moves a photoelectric cell or the like between adjustable limits.

It is a further object of the present invention to provide a scanner assembly in which the length of the excursions of the scanning device can be accurately adjusted during operation.

It is still another object of the present invention to provide a scanner assembly which provides output signals representative of the position of the scanning device.

It is a further object of the present invention to provide a photoelectric scanning assembly including an optical slit which is adjustable during a scanning operation.

It is a further object of the invention to provide a scanning assembly in which the mentioned adjustments can be remotely made.

The foregoing and other objects of the invention will become more clearly apparent from the following description when taken in conjunction with the accompanying drawing.

Referring to the drawing.

Figure 1:
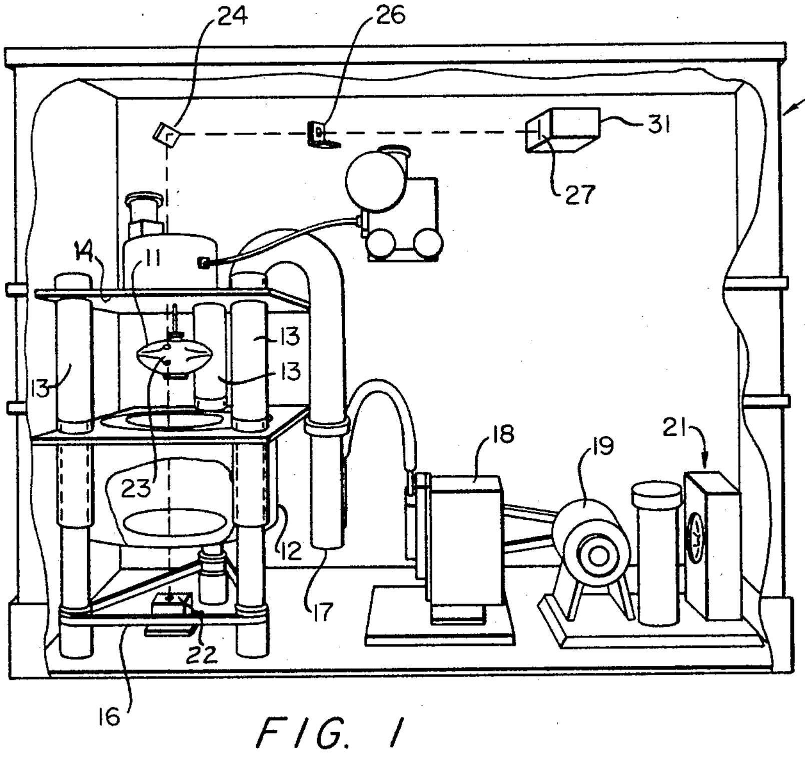
FIGURE 1 is a schematic diagram of an ultracentrifuge showing drive means, rotor, refrigerator, vacuum pump, optical system and scanner assembly in accordance with the invention.
Figure 5:
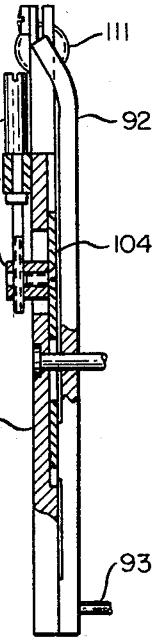
FIGURE 5 is a side elevational view, partly in section, of the slit assembly showing the vertical adjusting means, as shown on line 5—5 of FIGURE 4.

Referring now to FIGURE 1, there is shown an ultracentrifuge having a housing 10 which houses a centrifuge assembly. The centrifuge assembly includes a rotor 11 which rotates in a heavy steel chamber 12 mounted on spaced screws 13. Rotation of the screws moves the chamber upwardly into sealing engagement with the cover 14. The screws may be rotated, for example, by means of a driven chain 16. When the chamber is closed, it may be evacuated by a vacuum pump including a diffusion pump 17 and a backup pump 18 driven by a motor 19. The chamber 12 may be refrigerated by refrigeration equipment 21.

For continuously detecting sample concentration, light from a slit source 22 is paralleled by a collimating lens (not shown) and directed through the cell 23 carried by the rotor 11. In the region of the sedimenting boundaries, the light rays suffer absorption which the system is designed to measure. The parallel light is condensed by condensing lens (not shown) and then strikes a front surface deflecting mirror 24, passes through a lens 26 to form an image at the image plane designated generally by the reference numeral 27.

Figure 2:
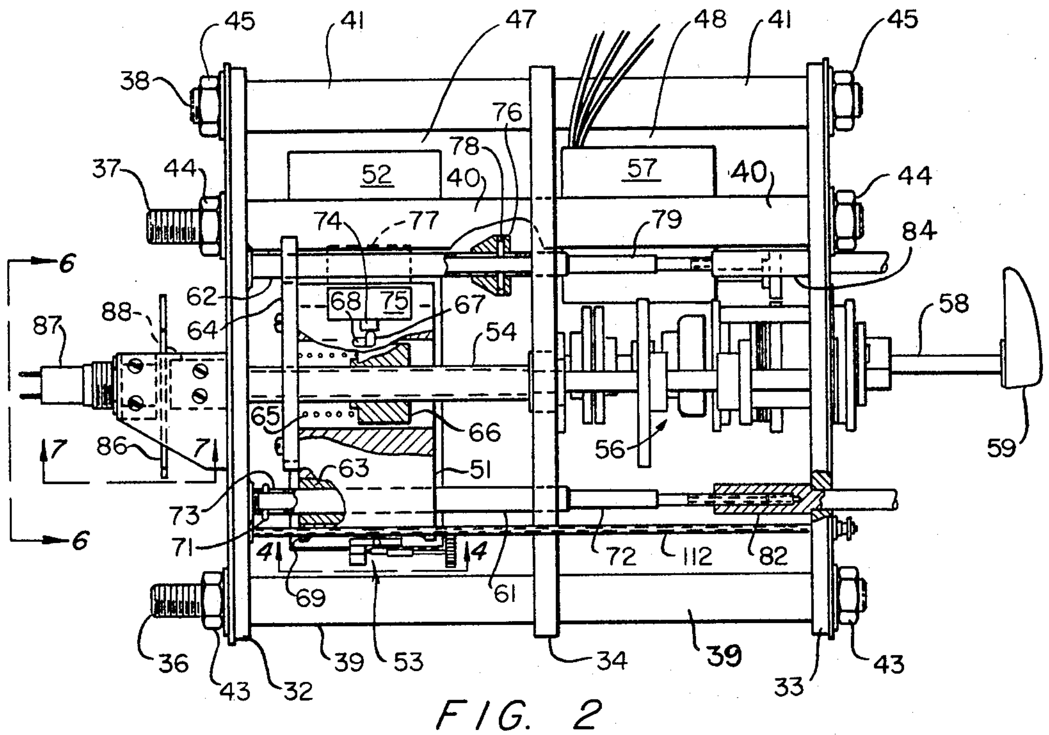
FIGURE 2 is a top view of the scanner assembly shown in FIGURE 1 with the cover removed to show the internal parts.
Figures 3, 4:
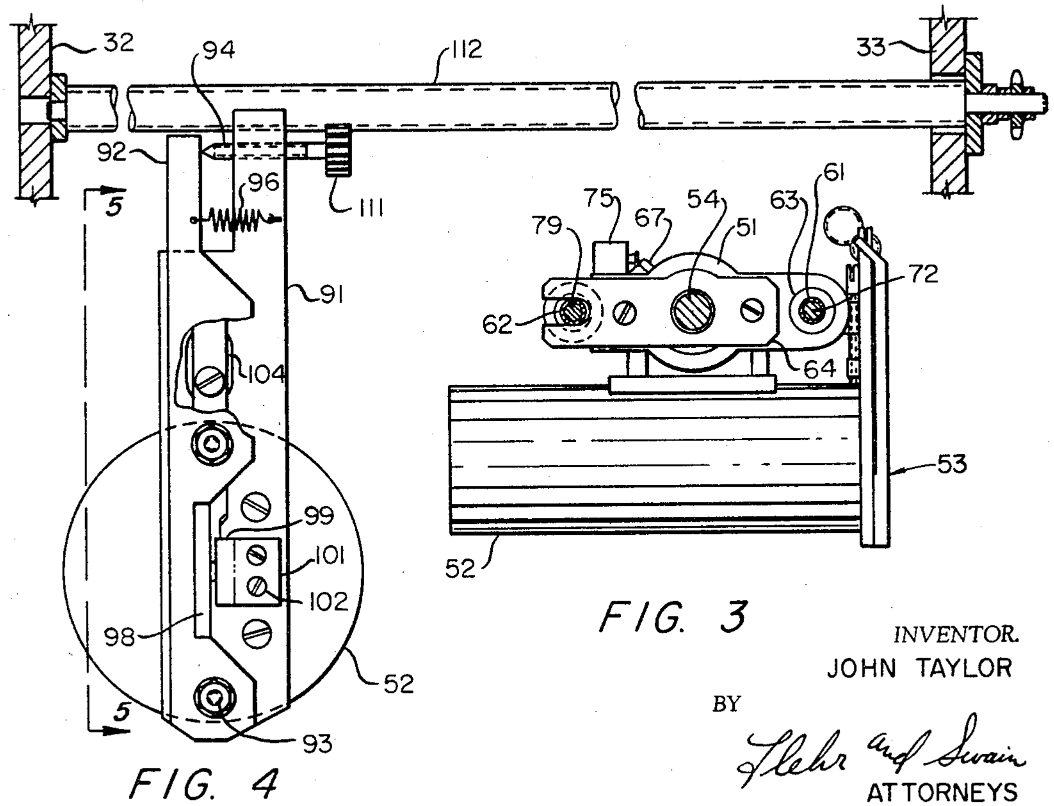
FIGURE 3 is a partial sectional view of the scanner assembly shown in FIGURE 2.
FIGURE 4 is an enlarged view showing the slit assembly employed with the photoelectric device carried by the scanner assembly, as shown at line 4—4 of FIGURE 2.

A scanning assembly 31 in accordance with the present invention is disposed at the image plane 27. Referring more particularly to FIGURES 2 and 3, the scanning assembly includes spaced substantially parallel walls 32 and 33, and a partition wall 34. The walls are maintained in spaced relationship by means of bolts 36, 37 and 38 provided with spacing sleeves 39, 40 and 41, and having their ends threaded to receive lock nuts 43, 44 and 45. The space 47 between the walls 32 and 34 serves to accommodate the scanning mechanism, while the space 48 between the walls 33 and 34 serves to accommodate the drive assembly.

A carrier 51 serves to carry a tubular housing 52 which encloses or houses the photoelectric device, for example, a photomultiplier tube. An adjustable slit assembly 53, to be presently described in detail, is carried at one end of the tubular assembly 52.

The carrier 51 is driven between fixed limits by a lead screw 54. The lead screw is rotated by a three-speed gear assembly 56 energized by a motor 57. The three-speed gear assembly may be of any conventional design and is not described further herein since it does not form a part of the present invention. However, the gear assembly is preferably controlled by shaft 58 rotated by a knob 59 which is journalled in the wall 33.

The carrier is guided by spaced pins 61 and 62 carried between the walls 32 and 34. One end of the carrier 51 is bored and carries a bushing 63 which rides on the pin 61 to guide the carrier along the pin. One face of the carrier is provided with a forked retaining plate 64. The forked end rides over the pin 62. The plate 64 is suitably secured to the carrier as, for example, by means of screws.

The center of the carrier 51 is bored to accommodate nut 66 which is threadably received by the lead screw 54. The nut carries a pin 67 which extends through opening 68 formed in the carrier. The pin holds the nut whereby rotation of the lead screw moves the nut longitudinally along the same. A spring 65 is interposed between the retaining plate 64 and the nut 66 to urge the nut to the right as viewed in the figure until the pin 67 strikes the edge of the opening 68 whereby to yieldably urge the carrier to the right as viewed in the figure. By rotation of the lead screw, the carriage is then caused to travel back and forth along the spaced guides 61 and 62.

When motion is from right to left, as viewed in the figure, the carrier travels until its face 69 abuts the limit pin 71. The limit pin 71 is carried by the shaft 72 which is slidably received within the guide pin 61 and extends through the elongated slots 73. When the carriage strikes the limit pin, its motion to the left is stopped. However, the nut 66 can continue to move forward compressing the spring 65 until the pin 67 strikes the control button 74 of reversing switch 75. The switch is connected in circuit with the reversible motor 57 and reverses the motor whereby the carriage begins to travel in the opposite direction, from left to right as viewed in the figure. The carriage moves to the right until the collar 76 engages reversing switch 77. The collar is slidably carried on the pin 62 and is engaged by a pin 78 disposed on the shaft 79 slidably received within pin 62. The pin 62 is slotted to permit longitudinal movement of the pin for positioning the collar.

The motor is then reversed and the carriage again travels from right to left. In the movement described above, the travel from right to left is exactly controlled by the pin 71 and does not depend upon the switching characteristics of the switch thereby giving an accurate reproducible positioning in this direction. When the carriage travels in the opposite direction, the positioning is not an exact positioning since the switch will not switch at exactly the same time for a given amount of pressure exerted by the collar 76.

The position of both the pin 71 and the collar 76 can be adjusted by means of the sliding shafts 72 and 79. The ends of the shafts 72 and 79 are threadably received by threaded bushings 82 and 84, respectively, which are journalled into and extend beyond the end plate 33. The bushings can be rotated externally of the housing whereby to position the pin 71 and collar 76 to control the limits of excursion of the carriage.

A photoelectric system including a slotted disc 86, photoelectric cell 88 and light source 87 is employed to give an electrical signal representative of the amount of rotation of the lead screw 54, and consequently the position of the carriage therealong.

Figure 6:
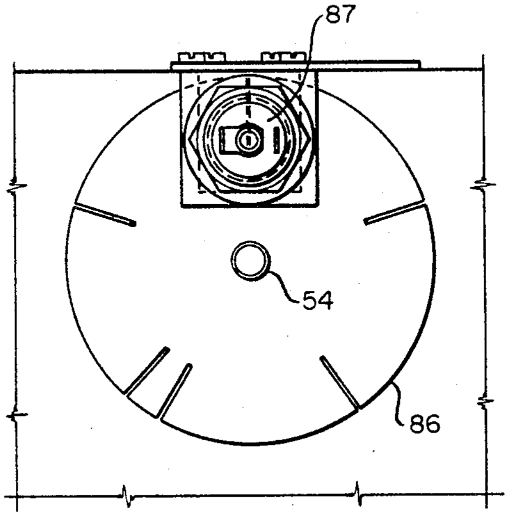
FIGURE 6 is an end view of the scanner device position signal generator.
Figure 7:
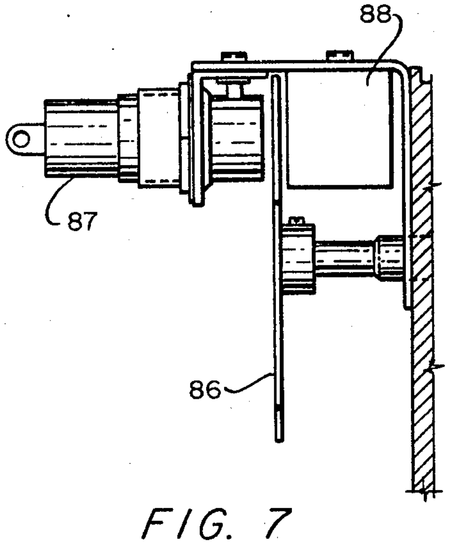
FIGURE 7 is an elevational view of the position signal generator.

Referring more particularly to FIGURES 2, 6 and 7, the slotted disc 86 is carried on the end of the lead screw 54. The slotted disc rotates between the light source 87 and photoelectric transducer 88 whereby to either block or pass light from the light to the transducer. Each time a slot travels between the light and transducer, the transducer provides an output pulse. As shown more clearly in FIGURE 6, there are provided five equally spaced slots with a sixth slot close to one of the others to provide a double pulse output for each revolution of the disc.

In operation then, rotation of the lead screw rotates the disc and the slots pass between the source of light 87 and the photoelectric cell 88 which generates an output pulse as each slot passes between the same. A double pulse corresponds to a full revolution of the lead screw and a single pulse corresponds to one-fifth of a revolution. The electrical output relates to the position of the photomultiplier tube along the scanning path or the lead screw.

As previously described, the end of the tube 52 carries an adjustable slit assembly 53. Referring to FIGURES 2, 3, 4 and 5, the slit assembly includes a fixed arm 91 and a movable arm 92 pivoted on pin 93. A screw 94, threadably received by the end of the fixed arm 91, engages the end of arm 92 to rotate it about the pivot pin 93. The arm 92 is spring-loaded by means of a spring 96 which yieldably holds the arm 92 against the end of screw 94.

The lower end of movable arm 92 is bevelled to form a knife edge 98 which cooperates with the knife edge 99 formed on the block 101. The block 101 is mounted on the fixed arm by means of spaced screws 102. In operation, the movable arm is closed and the block 101 is adjusted until the knife edges 98 and 99 abut one another and are in alignment. The screws 102 are then secured. The screw 94 is then rotated to open the knife edges to form a slit having a predetermined width.

The length of the slit is controlled by a slide 104 which is moved up and down by a screw 106. The screw 106 is captive in a bearing block 107 and threaded into the threaded boss 108. The boss 108 is, in turn, secured to the slide 104 whereby rotation of the screw 106 serves to move the slide 104 up and down. The lower edge of the slide controls the slit length.

It is often desirable to adjust the slit width while the apparatus is in operation. For this purpose, the screw 94 is provided with a gear-like knob 111 which engages the elongated pinion gear 112 which is journalled between the walls 32 and 33 and can be rotated externally of the housing. Rotation of the pinion gear 112 serves to rotate the screw 94 and adjust the slit width. It is seen that the gear 111 can move back and forth along the pinion gear 112 without altering the slit width. It is further observed that the slit width may be adjusted while the apparatus is in motion or when the apparatus is idle.

Thus, there is provided a scanning assembly in which the scanning speed, the limits of the excursion and the optical slit width can all be adjusted from the outside of the apparatus without the necessity of interrupting a run, removing covers and the like. The width of the optical slit can be noted by providing an external scale for reading the slit width. Repeatable exact stopping is achieved by a positive stop and a yieldable drive.

I claim:

1. A scanner assembly comprising a carriage, a photoelectric transducer carried by said carriage, an adjustable slit assembly for controlling the energy impinging on said transducer, guide means for guiding said carriage for movement back and forth, moving means for reversibly moving said carriage along said guide means, an adjustable stop for limiting movement of said carriage in one direction, yieldable means interposed between said moving means and said carriage to permit movement of the moving means after the carriage engages said adjustable stop, and means for adjusting said slit while the carriage is in motion.

2. A scanner assembly as in claim 1 in which said slit assembly includes first and second arms, means providing a pivot at one end of said arms, a spring disposed at the other end of said arms for urging said ends towards one another, a screw threadably received by said other end of one of said arms and engaging the other arm to move the same so that the arms may be opened and closed, means defining a slit carried by said arms whereby the slit is varied with movement of said arms, a gear carried by one end of said screw, an elongate pinion gear engaging said screw gear and permitting longitudinal movement of the same therealong, said gears permitting rotation of the screw while the carriage is in motion.

3. A scanner assembly comprising a carriage, guide means for guiding said carriage, a lead screw, a nut threadably received by the lead screw and adapted to move said carriage back and forth with rotation of said screw in first and second directions, spring means interposed between said nut and said carriage for yieldably driving said carriage in at least one direction, an adjustable stop adapted to engage and stop the carriage, a motor for rotating said lead screw, first and second switch means connected in circuit with said motor and adapted to control the direction of rotation of the motor, means for actuating said first switch means when the carriage has travelled a predetermined distance in one direction, and means for actuating said second switch means when the carriage has travelled a predetermined distance in the opposite direction, said first means serving to actuate said switch after the carriage has engaged said stop.

4. A scanner assembly as in claim 3 in which said guide means comprises first and second spaced guides, and in which said adjustable stop comprises a pin, a shaft carried within said first guide and longitudinally movable within the same, a slot formed in said guide, said pin being affixed to said shaft and extending through said slot, and means engaging said shaft to move the same within the guide whereby the pin is positioned along the guide.

5. A scanner assembly as in claim 3 in which said means for actuating the second switch comprises a collar slidably carried on said second guide, a shaft carried within said second guide and longitudinally movable therein, a slot formed in said guide, a pin carried by said shaft extending through said slot and engaging said collar, and means engaging said shaft to move the same within the guide whereby the collar is positioned along the guide.

6. A scanner assembly as in claim 3 including a photoelectric transducer carried by said carriage, an adjustable slit assembly for controlling the energy impinging on said transducer carried for movement with the transducer, and means for adjusting said slit while the carriage is in motion.

7. A scanner assembly as in claim 6 in which said slit assembly includes first and second arms, means providing a pivot at one end of said arms, a spring disposed at the other end of said arms for urging said ends towards one another, a screw threadably received by said other end of one of said arms and engaging the other arm to move the same so that the arms may be opened and closed, means defining a slit carried by said arms whereby the slit is varied with movement of said arms, a gear carried by one end of said screw, an elongate pinion gear engaging said screw gear and permitting longitudinal movement of the same therealong, said gears permitting rotation of the screw while the carriage is in motion.

References Cited

UNITED STATES PATENTS

| | | | |
|---|---|---|---|
| 1,075,614 | 10/1913 | Tschorner. | |
| 1,176,147 | 3/1916 | Keen. | |
| 2,479,293 | 8/1949 | Bayless | 250—234 X |
| 2,628,680 | 2/1953 | Seybold | 83—416 |
| 2,686,894 | 8/1954 | Mathieu | 318—277 |

DAVID J. GALVIN, *Primary Examiner.*

V. LAFRANCHI, *Assistant Examiner.*